Feb. 18, 1947.  E. S. RUSSELL  2,415,849
ROTARY SLIDE INDICATOR
Filed Dec. 28, 1944  3 Sheets-Sheet 2

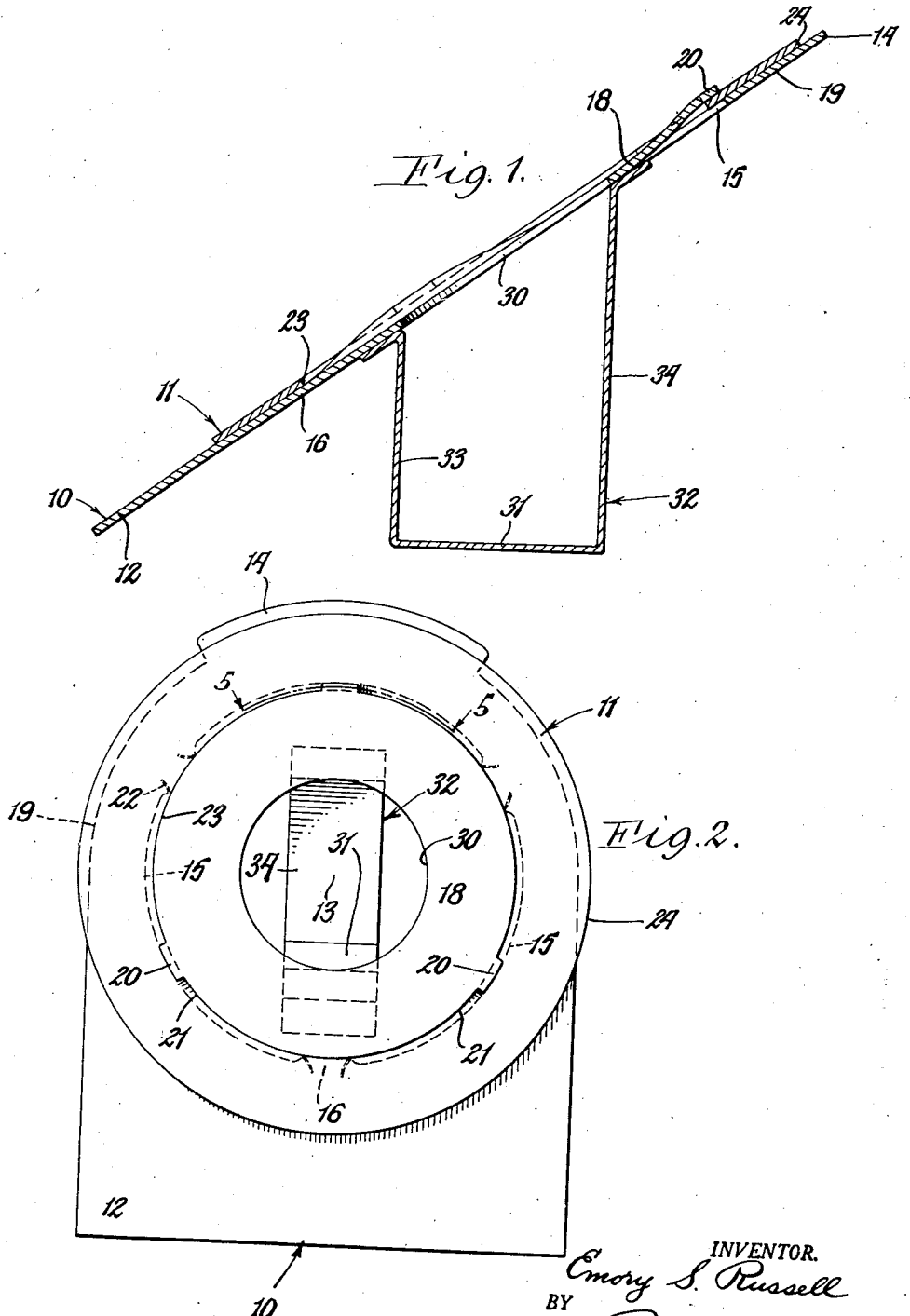

INVENTOR.
Emory S. Russell
BY
Popp and Popp
ATTORNEYS

Feb. 18, 1947.  E. S. RUSSELL  2,415,849
ROTARY SLIDE INDICATOR
Filed Dec. 28, 1944  3 Sheets-Sheet 3
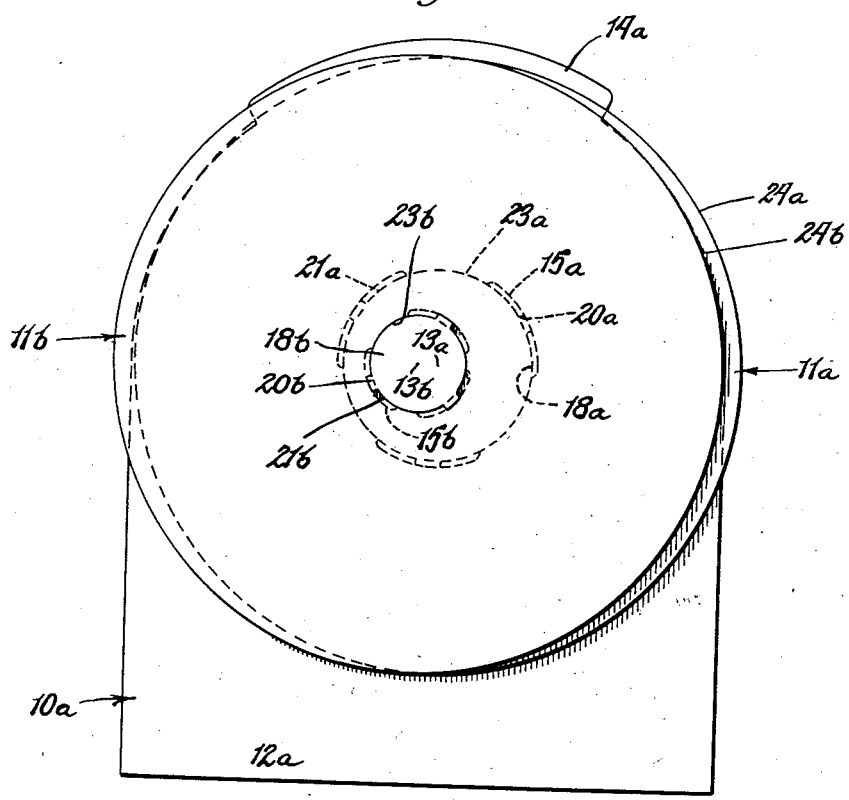

Patented Feb. 18, 1947

2,415,849

UNITED STATES PATENT OFFICE 2,415,849

ROTARY SLIDE INDICATOR

Emory S. Russell, Kenmore, N. Y.

Application December 28, 1944, Serial No. 570,085

3 Claims. (Cl. 235—122)

This invention relates to a rotary slide indicator and more particularly to an indicator made of cardboard or similar sheet material, such as plastic, and comprising a body sheet with one or more circular slides, concentric or otherwise, mounted on the body sheet and capable of being rotated relative to the body sheet and to one another. Such slide indicators have a wide variety of uses, for example in color combination comparison where different colored segments on the slides are rotated relative to different colored segments on the body sheet; in supplying information concerning different uses or different varieties of a product being displayed where the uppermost slide can be provided with a cutout to expose successively sections of informative matter printed on the body sheet or on a slide under the uppermost slide. Inasmuch as the present invention is not concerned with the particular use of the indicator, that is, whether used for comparison, informative or calculating purposes, no detailed showing is made thereof.

One of the principal objects of the present invention is to provide such a rotary slide indicator which is composed of slidingly interfitted pieces of cardboard, sheet plastic or similar sheet material which are rotatable relative to one another, such interfitting avoiding the necessity and expense of special fasteners or bearing members as well as avoiding the necessity for holding the parts in registry while being fastened together, the die cutting of the sheets automatically insuring their proper registry when brought into assembled relation.

Another object is to provide such a rotary slide indicator composed of relatively rotatable, slidingly interfitted pieces of cardboard which are easily and quickly brought into assembled relation with one another.

Another aim is to provide such a rotary slide indicator composed of relatively rotatable, slidingly interfitted pieces of cardboard, in which there is a minimum of frictional resistance to the rotation of the pieces relative to one another and in which each slide has adequate edge bearing surfaces against corresponding bearing surfaces on the body or supporting sheet so that there is no danger of the slide cutting itself free to an extent which will interfere with the operation or accuracy of the indicator.

Another purpose is to provide such a rotary slide indicator all parts of which can be made on commercial paper-forming machinery thereby to permit of large scale production of the indicators at very low cost.

Another object is to provide such a rotary slide indicator in which there is no danger of accidental derangement of the slide or slides.

Another object is to provide such a rotary slide indicator in which the slide or slides are in the form of rings open at their centers. By this means both the inner and outer edges of at least the outermost ring are available for comparing, calculating or information indicating purposes and the bodies of the rings can also be provided with windows for similar purposes.

Another object is to provide such a rotary slide indicator in which the slide or slides are in the form of rings open at their centers and which expose a central portion of the body or supporting sheet. Since the body or supporting sheet is normally stationary this permits the invention to be incorporated in a counter display device in which a can or bottle of the product being displayed projects through an opening in this central exposed part of the body sheet thereby to provide a support for the indicator; to display the product itself along with the indicator; and to do this without interference with the manipulation of the slides.

Another object is to provide such an indicator which can include a plurality of slides arranged in either concentric or eccentric relation to one another. By this means the uppermost slide can be in the form of a masking slide for further segregating information provided by windows in the under slide traversing scales on the body sheet. By the concentric arrangement of the slides various combinations of windows and scales can be employed. By the eccentric arrangement edges of the slides can be brought out of register with each other so that they can be individually grasped without interference from the other slide.

Another object is to provide such a rotary slide indicator in which the attachment of the slides to the supporting or body sheet can only be discerned on close inspection thereby not only rendering substantially the full area of the pieces useful but also rendering the same attractive in appearance as well as imparting an air of mystery to the indicator.

Another object is to provide such a rotary slide indicator in which each slide is caused to lie in face contact with the body sheet, or other slides as the case may be, this being a function of the warping or distortion, in operation, of the pieces which is inherent in the construction of the indicator. This operational warping or distortion of the pieces also tends to correct any permanent warping or distortion thereof.

Another object is to provide such a rotary slide indicator which is readily packed in that the thickness of the indicator is only the thickness of its component sheets and is free from bulky eyelets or other fastenings.

Another aim is to provide such a rotary slide indicator which, by the generally concentric arrangement of two or more slides, the overall dimensions of the calculator can be reduced and the masking effect of the outermost slide can be applied over the full diameter of the face which it covers and not merely one radial side thereof.

Other objects and advantages will appear from the following description and drawings in which:

Fig. 1 is a vertical longitudinal section through a rotary slide indicator embodying the present invention and showing the same in the form of a counter display adapted to frame a bottle of the product being advertised.

Fig. 2 is a face plan view thereof, the indicator being viewed parallel with its angularly disposed face as viewed in Fig. 1.

Fig. 5 is an arcuate fragmentary sectional view, taken on line 5—5, Fig. 2.

Fig. 6 is a view similar to Fig. 2 and showing a modified form of the invention.

Figure 3:
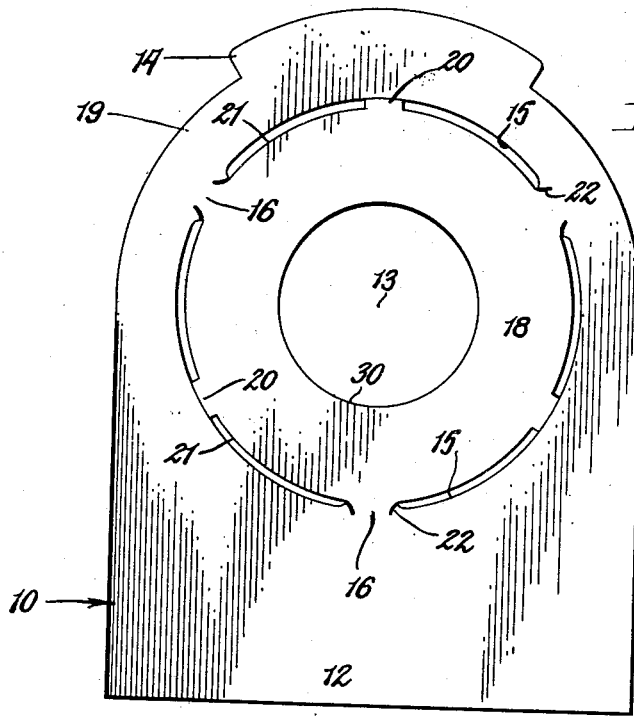
Fig. 3 is a plan view of the body or supporting sheet of the indicator shown in Figs. 1 and 2.
Figure 4:
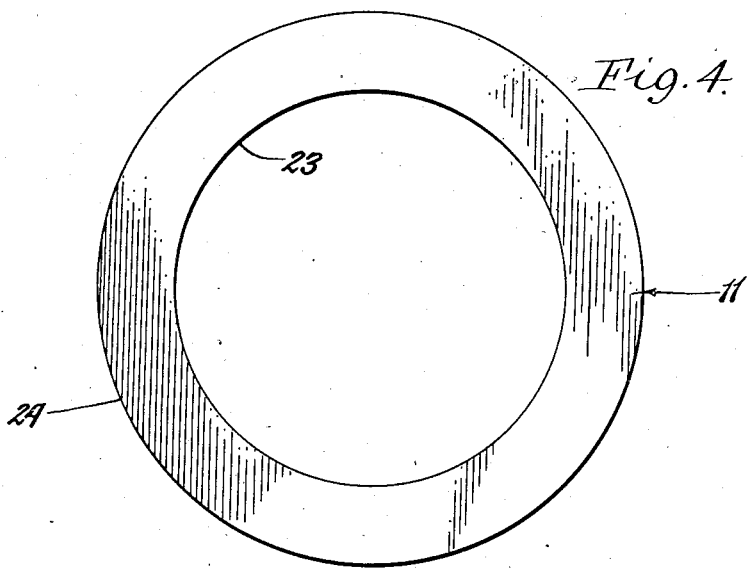
Fig. 4 is a plan view of the rotary slide of the indicator shown in Figs. 1 and 2.

The rotary slide indicator, as illustrated in Figs. 1–5, is shown as including a body or supporting sheet 10 of cardboard on which is rotatably mounted a slide 11 of cardboard, these parts being illustrated in plan, respectively, in Figs. 3 and 4. While the body or supporting sheet 10 can be of various forms it is shown as comprising a rectangular bottom portion 12, the side edges of which merge into arcuate edges concentric with an axis 13. At its top the body or supporting sheet can be provided with a radially outwardly extending tab 14 by which the body or supporting sheet can be conveniently grasped at its top.

Concentric with the axis 13, the body or supporting sheet 10 is provided with a series of arcuate slits or slots 15, three being shown, the ends of these slits or slots being separated by bridging pieces 16 which thereby connect an inner portion or disk 18 of the body sheet integrally with an outer portion or annular rim 19 thereof. At the center of each arcuate slit or slot 15, the inner portion or disk 18 of the body is cut to provide a radially outwardly extending tab or flat finger 20, each tab extending outwardly from the arcuate edges 21 provided by the slit or slot 15 around the margin of the inner portion or disk 18 of the body or supporting sheet 10. To minimize tearing at the ends of the slits or slots 15, each end thereof is preferably continued outwardly in the form of an outwardly curving tail 22. Also while the slits or slots 15 are shown as being in the form of slots of substantial width they could be in the form of slits formed by single knife edges, the essential feature being the provision of the arcuate concentric edges 21, which form bearing surfaces as hereinafter described, and the central tabs 20 projecting radially from these edges. These tabs can project radially outward from these edges 21, as shown, or could project radially inward from the complementary edges of the rim 19.

The slide 11 is shown in Fig. 4 as comprising a simple card-board ring having an inner circular edge 23 and a concentric outer circular edge 24. The diameter of the inner circular edge 23 of this slide is substantially equal to the diameter of the edges 21 of the slits or slots 15 of the body or supporting sheet 10. Securing together the body 10 and slide 11 of the indicator is effected by the simple expedient of pressing the center of the inner portion or disk 18 of the body 10 axially so as to render this inner portion or disk 18 of the body 10 concave. This draws the outer extremities of the three tabs 20 toward the axis 13 so that the ring or slide 11 can be placed around these tabs and so that, when the inner portion or disk 18 of the body 10 is permitted to resume its flat condition, these tabs 20 slide over the front face of the ring or slide 10 and hold it concentric with the axis 13, as best shown in Figs. 1 and 2.

When so assembled it will be noted that the inner edge of the ring or slide 11 passes successively over a bridging piece 16, under a tab 20, over a bridging piece 16 and so on. This not only shapes the ring or slide 11 to have a wavy or undulating form but brings its inner edge 23 successively into direct bearing engagement at six places with each of the edges 21 of the slits or slots 15. Therefore with the indicator shown in Figs. 1–5, the slide or ring 11 is supported by six bearing surfaces each of substantial length and thickness, the thickness being the thickness of the cardboard used and the length being the length of coincidence of the edges 23 with each of the edges 21. These broad bearing surfaces ensure against the slide cutting itself out of coaxial alinement with the axis 13 even when the indicator is constantly used. The wearing qualities are particularly improved as compared with eyelets which quickly wear loose due to the very small bearing area provided by such eyelets. Further, as compared with both eyelet and envelope types of fasteners, the slide 11 is always free running. Since the slide 11, and also to a certain degree, the supporting or body plate 10, are distorted axially to fit each other, the slide is always held flat against the supporting or body sheet. This warping or distortion is operational and therefore the use of the indicator tends to correct any tendency toward permanent warping or distortion of the parts.

When used for color comparison or the like, the slide 11 and the body or supporting sheet 10 can have segments of different colors which are successively rotated into register with one another and it will be noted that because of the ring form of the slide 11 both edges thereof are usable. That is, the compared segments on the body sheet 10 can be printed within the slide 11, outside of this slide, or both. Since the particular use to which the indicator may be put does not form a part of the invention, such details have not been shown.

It will be noted that by the mounting shown for the slide 11, the inner portion or disk 18 does not rotate and is exposed on both sides of the indicator. This permits of the use of this portion for a number of purposes, such as for displaying a package or bottle of the merchandise being advertised by the indicator. Thus, as shown in Figs. 1–5, a hole 30 can be left in this inner portion or disk 18 of the body or supporting sheet 10 through which a bottle or package (not shown) of the goods to be displayed can be inserted. In order to hold the indicator at a conveniently readable and workable angle and also to use the box or container to weight the indicator, this bottle or package can rest on the cross part 31 of a standard 32, this standard having a short front leg 33 secured to the body or supporting sheet 10 in front of the opening 30 and a longer rear leg 34 secured to the body or supporting sheet 10 in rear of the opening 30. It will be seen that the support 32 holds the indicator at the convenient angle shown in Fig. 1 and that the mass of the bottle on the cross part 31 and projecting up through the hole 30 prevents displacement and collapse of the display as well as serving to display the product itself.

Also since the inner portion or disk 18 does not rotate and is exposed on both sides of the indicator, it will be seen that this portion can be used to rotatably support one or more additional rotary slides mounted in the same manner on either front or rear side of this inner portion 18. Thus, as illustrated in Fig. 6, the rotary slide or disk 11a is mounted on the body or supporting sheet 10a in the same manner as with the form of the invention shown in Figs. 1–5 and the same reference numerals have therefore been employed and distinguished by the suffix "a." The inner portion or disk 18a of the body or supporting sheet 10a is exposed, so far as the slide 11a is concerned, and this inner portion is used to rotatably support a second or masking disk 11b. This masking disk 11b is mounted on the central part 18a of the body or supporting sheet 10a in the same manner as with the form of the invention shown in Figs. 1–5 and the same reference numerals have therefore been employed and distinguished by the suffix "b." While the axes 13a and 13b of the slides 11a and 11b could be arranged to coincide, these axes are shown as spaced to the right and left, respectively, of the center of the body or supporting sheet 10a. By this means the edge of the circular slide 11a is exposed at the right of the indicator as a single thickness which can be conveniently grasped by the user's fingers. Similarly the edge of the circular slider 11b is exposed at the left of the indicator as a single thickness which also can be conveniently grasped by the user's fingers.

From the foregoing it will be seen that the present invention provides an extremely simple and low cost circular slide indicator which will stand up under conditions of severe and constant use without losing registry of the parts; which can have one or more circular sliders arranged coaxially or not as desired; and which can be put to a wide variety of uses.

I claim as my invention:

1. A rotary slide indicator, comprising a sheet of flexible material formed with a plurality of curved slits of substantial extent providing curved edges equidistant from and concentric with an axis and separated at their ends by narrow bridging pieces thereby to provide a circular center portion and a rim portion connected to said center portion by said bridging pieces, and a second sheet of flexible material in the form of a ring arranged in face-to-face engagement with said first sheet of flexible material and having its inner circular edge concentric with said axis and registering with said first curved edges in opposition thereto, said first sheet of flexible material being cut to provide a narrow tab extending radially outward from each of its curved edges adjacent the center of the corresponding slit and into engagement with the opposite face of said second sheet of flexible material, whereby said sheets are rotatable relative to each other about said axis and whereby the curved edges thereof have a plurality of interengaging bearing surfaces of substantial extent concentric with said axis for holding said sheets in coaxial relation to each other.

2. A rotary slide indicator, comprising a sheet of flexible material formed with a first group of curved slits of substantial extent providing curved edges equidistant from an axis and separated at their ends by narrow bridging pieces thereby to provide a circular center portion and a rim portion connected to said center portion by said bridging pieces, and said circular center portion of said sheet of flexible material being provided with a second group of curved slits of substantial extent providing curved edges equidistant from an axis and separated at their ends by narrow bridging pieces thereby to provide a second circular center portion and a second rim portion connected to said second center portion by said last bridging pieces, two slides of flexible material each in the form of a ring and arranged in face-to-face engagement with each other and with said first sheet of flexible material, one of said slides having its inner circular edge registering with said first group of curved edges in opposition thereto and the other of said slides having its inner circular edge registering with the second group of curved edges in opposition thereto, said first sheet of flexible material being cut to provide a narrow tab extending radially outward from each of its said curved edges adjacent the center of the corresponding slit and in engagement with the opposite face of the corresponding slide, whereby said slides are freely rotatable relative to each other and to said first sheet of flexible material and whereby the inner circular edge of each slide has a plurality of interengaging bearing surfaces of substantial extent with said curved edges of said first sheet.

3. A rotary slide indicator, comprising a sheet of flexible material formed with a first group of curved slits of substantial extent providing curved edges equidistant from an axis and separated at their ends by narrow bridging pieces thereby to provide a circular center portion and a rim portion connected to said center portion by said bridging pieces, and said circular center portion of said sheet of flexible material being provided with a second group of curved slits providing curved edges equidistant from an axis and separated at their ends by narrow bridging pieces thereby to provide a second circular center portion and a second rim portion connected to said second center portion by said last bridging pieces, two slides of flexible material each in the form of a ring and arranged in face-to-face engagement with each other and with said first sheet of flexible material, one of said slides having its inner circular edge registering with said first group of curved edges in opposition thereto and the other of said slides having its inner circular edge registering with the second group of curved edges in opposition thereto, said first sheet of flexible material being cut to provide a narrow tab extending radially outward from each of its said curved edges adjacent the center of the corresponding slit and in engagement with the opposite face of the corresponding slide, whereby said slides are freely rotatable relative to each other and to said first sheet of flexible material and whereby the inner circular edge of each slide has a plurality of interengaging bearing surfaces of substantial extent with said curved edges of said first sheet, the said axis for said first group of curved slits being arranged eccentric to the said axis for said second group of curved slits.

EMORY S. RUSSELL.

REFERENCES CITED

The following references are of record in the file of this patent:

UNITED STATES PATENTS

| Number | Name | Date |
| --- | --- | --- |
| 855,827 | Willson | June 4, 1907 |
| 1,587,685 | Tillinghast | June 8, 1926 |

OTHER REFERENCES

A trade circular copyrighted in 1945 by the National Gypsum Company of Buffalo, New York, entitled "Gold Bond Sunflex DeLuxe."